United States Patent [19]

Ward et al.

[11] Patent Number: 5,051,211
[45] Date of Patent: Sep. 24, 1991

[54] POLYMERIC MATERIALS

[75] Inventors: Ian M. Ward, Leeds; James E. McIntyre, Harrogate, both of England; Dennis J. Bannister, Mount Waverley, Australia; Peter G. Hall; Geoffrey R. Davies, both of Leeds, England

[73] Assignee: National Research Development Corporation, England

[21] Appl. No.: 327,993

[22] Filed: Mar. 23, 1989

Related U.S. Application Data

[63] Continuation of Ser. No. 761,588, Jul. 16, 1985, abandoned.

[30] Foreign Application Priority Data

Dec. 9, 1983 [GB] United Kingdom ............ 8332953
Nov. 16, 1984 [GB] United Kingdom ............ 8428865
Dec. 10, 1984 [GB] United Kingdom .................. PCT
GB84/00424

[51] Int. Cl.$^5$ .................. H01M 6/18; H01B 1/06
[52] U.S. Cl. ........................... 429/192; 252/500; 252/518; 252/519; 252/62.2; 252/182.1
[58] Field of Search ............ 252/500, 512, 518, 519, 252/182.1, 62.2; 429/192

[56] References Cited

U.S. PATENT DOCUMENTS

| | | |
|---|---|---|
| 4,200,701 | 4/1980 | Wetton et al. |
| 4,230,604 | 10/1980 | Wingrave |
| 4,471,037 | 9/1984 | Bannister ............ 429/192 |
| 4,517,265 | 5/1985 | Belanger et al. .......... 252/182.1 |
| 4,556,615 | 12/1985 | Bannister ............ 429/192 |
| 4,556,616 | 12/1985 | Armand et al. .......... 252/182.1 |
| 4,578,326 | 3/1986 | Armand et al. .......... 252/62.2 |
| 4,589,199 | 5/1986 | North ............ 429/192 |
| 4,652,506 | 3/1987 | Belanger et al. .......... 429/192 |
| 4,654,279 | 3/1987 | Bauer et al. ............ 429/192 |
| 4,758,483 | 7/1988 | Armand et al. .......... 252/62.2 |

FOREIGN PATENT DOCUMENTS

| | | |
|---|---|---|
| 10037776 | 10/1981 | European Pat. Off. |
| 0078505 | 5/1983 | European Pat. Off. |
| 0095982 | 12/1983 | European Pat. Off. |
| 96629 | 12/1983 | European Pat. Off. |
| 97076 | 12/1983 | European Pat. Off. |
| 2090265 | 1/1972 | France |
| 2493609 | 5/1982 | France |

OTHER PUBLICATIONS

Tsuchida et al., Solid State Ionics, 11 (1983), 227–233.
H. Cheradame et al., Journal of Power Sources, 9 (1983), 389–395.

Primary Examiner—Josephine Barr
Attorney, Agent, or Firm—Rosenman & Colin

[57] ABSTRACT

An ionically conductive, ion-containing polymeric material prepared from an amorphous polymer and a source of ions and having a bulk ionic conductivity at 20° C. and 10 kHz greater than $10^{-6}\ \Omega^{-1}\ cm^{-1}$, wherein the copolymer comprises a backbone from which depends at least one residue of the formula:

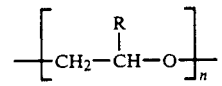

wherein:
n represent a number greater than 1; and
R represents a hydrogen atom or substituted or unsubstituted lower alkyl group.

19 Claims, 1 Drawing Sheet

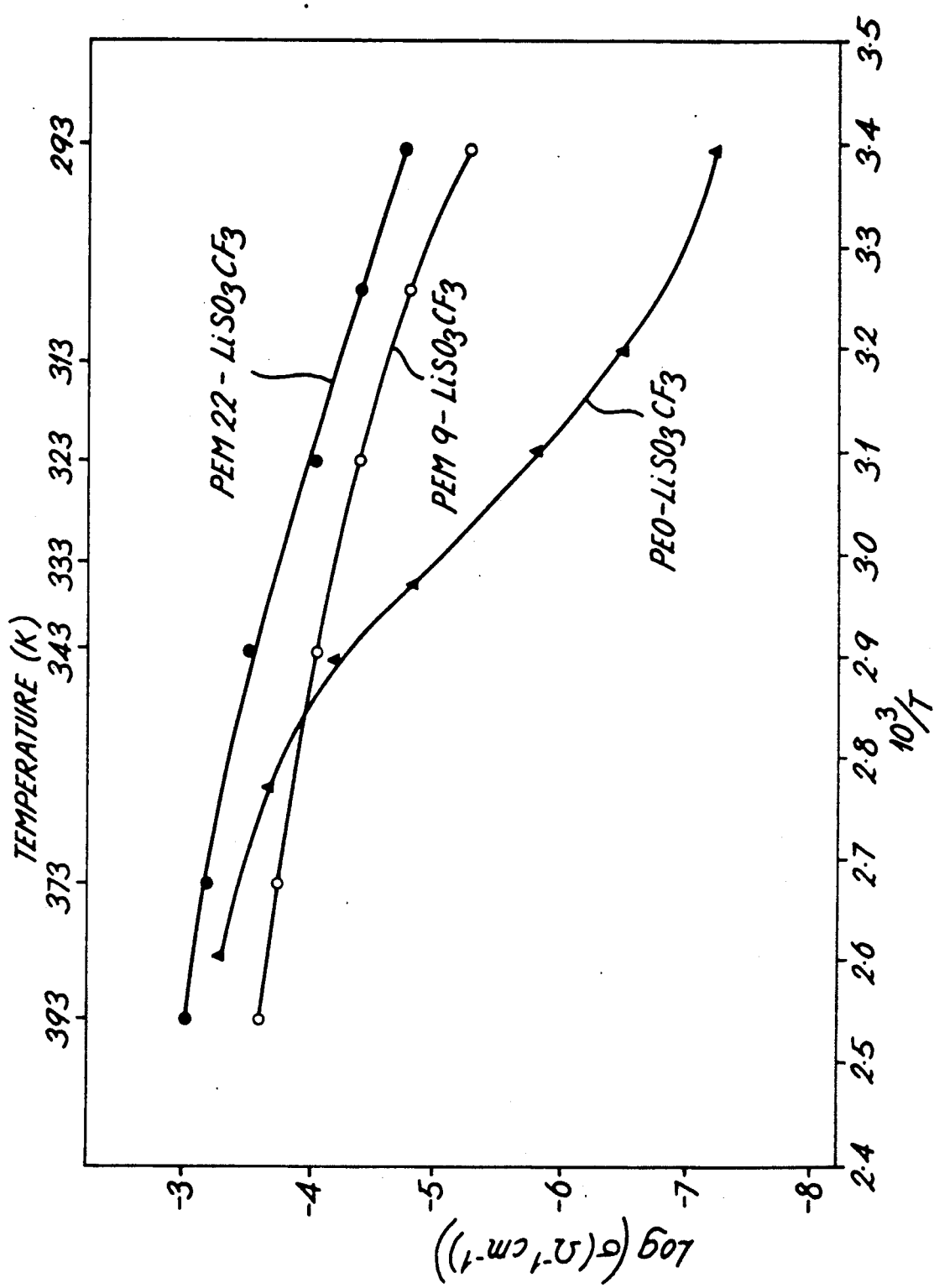

POLYMERIC MATERIALS

CROSS REFERENCE

This is a continuation of Ser. No. 761,588 filed July 16, 1985, now abandoned.

This invention relates to polymeric materials; more particularly, this invention relates to bulk ionically conductive polymeric materials and their preparation; and to galvanic cells comprising them.

The most commonly used electrolytes are fluid liquids which comprise solutions in a solvent liquid of solute ionic species. Such fluid liquid electrolytes, on incorporation into a galvanic cell, permit migration of ions between the electrodes of the cell and, as a consequence, the provision of electric free energy to a closed external circuit. Despite their widespread use such electrolytes nonetheless suffer from several disadvantages. Thus, they are often corrosive, leading to leakage from cells; or toxic; and may also be spilled. All of these factors present handling and storage problems.

In order, in part, to overcome the disadvantages inherent in fluid liquid electrolytes considerable effort has been expended in attempts to provide solid or highly viscous polymeric electrolyte materials which contain salts and which, although in solid solution, nevertheless display mobility, under appropriate conditions, of at least some of the ionic species present. A particularly prominent such polymeric material has been polyethylene oxide (PEO) in which certain ionic species are soluble and can form complexes. However, the electrical and mechanical properties of such polymeric electrolyte materials, although encouraging, require further enhancement before commercialisation is put in prospect.

This invention seeks to provide ionically conductive polymeric materials which not only exhibit superior storage properties together with reduced size and weight, relative to fluid liquid electrolytes, but also provide enhanced bulk ionic conductivities at ambient temperature.

According, therefore, to one aspect of this invention there is provided an ionically conductive, ion-containing polymeric material prepared from an amorphous polymer and a source of ions and having a bulk ionic conductivity at 20° C. and 10 kHz greater than $10^{-6}\Omega^{-1}$ cm$^{-1}$, wherein the copolymer comprises a backbone from which depends at least one residue of the formula:

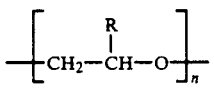

wherein:

n represents a number greater than 1; and

R represents a hydrogen atom or substituted or unsubstituted lower alkyl group.

The ion-containing polymeric materials of this invention provide much better ionic conductivities (both ambient and elevated temperature ionic conductivities but particularly those at ambient temperature) than uncrosslinked polymer-alkali metal salt complexes previously described and give ionic conductivities at least as high as crosslinked prior art systems. It is desirable that the ion-containing polymeric materials comprise no more than 10%, preferably no more than 5%, by volume of crystallites; and it is particularly preferred that the ion-containing polymeric material is amorphous. It is found that where n represents a number greater than 22 the materials are semicrystalline; indeed, where n is less than 22 but the $O/M^+$ ratio (hereinafter defined) is lower than 18 semicrystallinity may appear, especially on standing. It is also preferred that n is not less than 4; at lower values the volume fraction of conducting material present will not be high. It is found at $5 < n < 20$, preferably $7 \leq n \leq 15$ is very suitable. The ion-containing polymeric material may comprise solid solutions of the ion in the polymeric material or ion-polymer complexes (or indeed both). The particular constitution of the material in a given case will depend on the precise chemical nature of the components and the preparative method for producing the material R preferably represents a hydrogen atom or an unsubstituted lower alkyl group. By "lower alkyl" is meant herein a $C_1$ to $C_5$ alkyl group, preferably a $C_1$ to $C_3$ alkyl group. It is particularly preferred that R represents a hydrogen atom; i.e. that the residue comprises polymerised ethylene oxide units.

Not all of the n R groups in the residue need be the same; for example, one or more may represent a hydrogen atom while one or more may represent one or more lower alkyl groups, such as a methyl group. Where different R groups are present a random or block copolymeric residue will result. Random copolymeric residues may be prepared by concurrently ionically polymerising a mixture of the corresponding precursor substituted or unsubstituted oxiranes, while block copolymeric residues may be prepared by consecutively ionically polymerising each corresponding substituted or unsubstituted oxirane. As mentioned above, it is desirable that the ion-containing polymeric material is amorphous. Random copolymeric residues may comprise many polymerised substituted or unsubstituted alkylene oxide units as above defined without semicrystallinity appearing; block copolymeric residues may comprise in each block polymerised substituted or unsubstituted alkylene oxide units as above defined and wherein n is less than 22. Such random or block copolymeric residues may contain a minor amount (that is, less than 50%, and preferably less than 30%, by weight) of polymerised substituted or unsubstituted oxetane and/or acetal residues. It is preferred, however, that all of the nR groups in the residue are the same; and that they represent hydrogen atoms; i.e. that the residue is a polyethylene oxide residue.

A plurality of residues, which may be the same or different, may be chemically bonded together by one or more interposed groups different therefrom to depend from a single backbone site. Such a structure can enhance the volume fraction of conducting material while providing conditions which are unfavourable to crystallisation. An example, wherein each residue is the same and wherein each interposed group is the same, is given below:

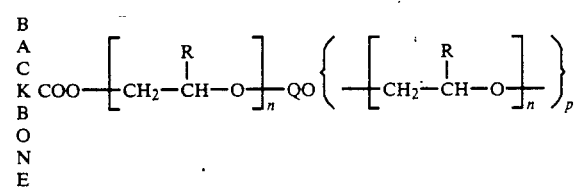

wherein:

n and R are as herein defined; and

Q is a (p+1) valent interposed group. Preferably, p represents a number from 1 to 2.

Not all the residues depending from the backbone need be the same. It is preferred, however, from the standpoint of ease of synthesis, that all of the residues depending from the backbone are the same; and that they are polyethylene oxide residues.

The backbone of the polymer component of the ion-containing polymeric material may be any linear or branched polymeric chain. The polymeric chains may be uncrosslinked, particularly if the resulting ion-containing polymeric material has sufficient dimensional stability at its operating temperature, or crosslinked; for example chemically crosslinked. Where crosslinking is effected, this may be done either pre- or post-fabrication of the ion-containing polymeric material. It is desirable, in order to obviate any tendency to stereoregularity which might facilitate crystallisation, that the backbone is formed by a free radical polymerisation, preferably by addition polymerisation; and it is particularly preferred that this polymerisation comprises the homo- or co-polymerisation of vinyl, vinylene or vinylidene monomers, thereby providing a saturated carbon-carbon backbone.

A preferred class of saturated carbon-carbon backbone is derivable, at least notionally, by the homo- or co-polymerisation of at least one olefinically unsaturated compound which is mono- or poly-substituted by (i) a functional group which can initiate the ionic polymerisation of oxiranes and/or (ii) a functional group which can react with a pre-formed polymer comprising ether residues, especially one terminated by an active hydrogen-containing functional group. Examples of such functional groups include carboxylic acyl chloride and anhydride, carboxylic acid, carboxylic amido, amino, alcohol and mercapto groups, especially carboxylic acid and alcohol groups. Particularly preferred such backbones are polyacrylic acid, polymethacrylic acid and polyvinyl alcohol.

The backbone of the polymer component of the ion-containing polymeric material need not be a saturated carbon-carbon backbone it may be an inorganic backbone, for example a siloxane backbone These may be formed by polymerising, alone or in admixture together and/or with one or more other substituted halosilanes, a substituted di- or tri-halosilane in which at least one substituent contains one or more residues of the formula:

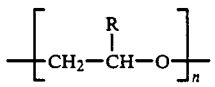

wherein n and R are as herein defined. Polymerisation may be effected by the addition thereto of an active hydrogen atom-containing compound; for example, water.

Suitable substituted di- or tri-halosilanes may be prepared by reaction of tetrahalosilanes or substituted trihalosilanes with polymers comprising at least one of the aforementioned residues and an active hydrogen atom-containing group; for example, a hydroxyl group. Preferably the halosilane is a chloro or bromosilane, desirably a dihalo di(subsituted or unsubstituted)hydrocarbyl of hydrocarbyloxy silane and/or a trihalo(substituted or unsubstituted) hydrocarbyl or hydrocarbyloxy silane. The or each hydrocarbyl or hydrocarbyloxy group, which may be the same or different, may suitably be an alkyl group, an alkenyl group or an alkoxy group, preferably a $C_1$ to $C_5$ alkyl group such as the methyl group. Preferably the or each hydrocarbyl group is an unsubstituted hydrocarbyl group.

The or each depending residue may be incorporated onto the backbone, in a manner known per se, to give the polymer component of the polymeric material of the invention in one of two general methods. Thus, the depending residue may be preformed and reacted with the or each backbone monomer, or may be polymerised onto the or each backbone monomer, which is subsequently polymerised. In the alternative, the backbone is first formed and is then reacted with a preformed residue-comprising compound or has the residue polymerised thereon.

The ion used in the formation of the polymeric materials of the invention is preferably a cation and is preferably monovalent. A particularly preferred class of cation is the alkali metal cation, such as lithium, sodium or potassium and substituted or unsubstituted ammonium. Lithium is preferred by reason of the current availability of electrode materials. The counterbalancing anion is preferably large in order to reduce gross segregation in use; for high ionic conductivities it is also preferred that the anion is a weak conjugate base. Examples include the monovalent anions derived from higher halogens and pseudohalogens; for example, $Br^-$, $I^-$ and $SCN^-$; complex inorganic, carboxylic and sulphonic, preferably perfluorinated alkyl carboxylic and sulphonic, monovalent anions; for example, $ClO_4^-$, $HgI_3^-$, $BF_4^-$, $C_mF_{2m+1}CO_2^-$ such as $CF_3CO_2^-$, $C_2D_5CO_2^-$, $C_3F_7CO_2^-$, $C_mF_{2m+1}SO_3^-$ such as $CF_3SO_3$, wherein m is an integer from 1 to 6, preferably from 1 to 3.

Polyvalent monomeric anions are also preferred since it is believed that, on the conduction of one of the associated cations therefrom, the remaining cations will bind the anion more tightly reducing its tendency to migrate. Examples include polyvalent inorganic anions, such as $AsF_6^{-3}$, and polyvalent carboxylic and sulphonic anions analogous with those monovalent anions aforementioned; for example $C_mF_{2m}(CO_2^-)_2$ and $C_mF_{2m}(SO_3^-)_2$ such as perfluorosuccinate and perfluoroglutarate. Polymeric anions are, in principle, particularly preferred since their size effectively precludes migration. They may comprise backbones as aforesaid from which depend, for example via a glycollic residue, an analogue for the aforementioned anions. Examples include poly(2-sulphoethyl methacrylate) and poly(2-(4-carboxyhexafluorobutanoyloxy)ethyl methacrylate). In practice, however, the polyvalent monomeric anions are most preferred on account of their ease of incorporation into the ion-containing polymeric material.

The polymeric materials of this invention are readily prepared by dissolving or swelling the polymer component of the ion-containing polymeric material in, and adding a suitable salt to, a mutual solvent at the appropriate concentration to give the required $O/M^+$ ratio; and then removing the solvent. There are a number of polar organic solvents, especially volatile organic solvents, which are found to be useful: lower ketones, such as acetone, lower alcohols, such as methanol, ethanol and aqueous mixtures thereof, lower carboxylic esters, such as ethyl acetate, dimethyl sulphoxide and acetonitrile have proved particularly effective. (As used herein, the ratio $O/M^+$ is the ratio of the number of moles of alkylene oxide to the number of moles of cation $M^+$.)

It is preferred that $O/M^+$ is from 4 to 30, especially from 8 to 20.

Blends of the complexes of this invention may be used.

The ion-containing polymeric materials this invention are found to have particularly high bulk ionic conductivities at ambient temperature. Thus $\log_{10}(\sigma(\Omega^{-1} cm^{-1}))$ is typically greater than $-5$, and often above $-4.5$.

The present invention also provides a galvanic cell wherein the electrolyte comprises an ion-containing polymeric material as herein defined; and a battery of such cells.

The following Examples illustrate the invention.

Conductivity measurements were effected as follows. The samples were pressed between stainless steel or other electrodes and conductivity measurements were carried out using a 1172 Solartron frequency response analyser. The complex admittance was measured as a function of frequency from $10^{-1}$ to $10^4$ Hz. Due to the blocking nature of the electrodes, the real part of the admittance rose with increasing frequency to a frequency independent plateau. The value at the plateau was used to calculate the bulk ions conductivity.

EXAMPLE 1

40 g of monomeric methoxy poly(ethylene glycol) methacrylate (ex Polysciences Ltd. wherein n as defined above has an average value of 9) were dissolved in distilled deionised water to provide a 10% by weight aqueous solution. The reaction vessel was purged of oxygen using a nitrogen bleed and polymerisation was then effected at 0° C. by introducing, at a concentration of 0.2% by weight of the monomer, the redox pair $K_2S_2O_8/FeSO_4$ as the free radical initiator. After 20 minutes from adding the initiator the viscosity of the solution appeared to have increased to a constant value; the reaction vessel was opened and a small amount of hydroquinone was added to terminate the polymerisation.

The polymer so prepared was next precipitated by addition to a 0.45M aqueous potassium sulphate solution which was then warmed to 50° C. (residual monomer and hydroquinone are soluble in this solution); and was filtered off. The polymer was promptly redissolved in acetone to free it from residual salts and these were filtered off. The filtered solution was thereafter added to a 50% by volume n-heptane/50% by volume acetone mixture to reprecipitate the polymer and to remove trace monomer and hydroquinone. Finally, trace salt was removed by redissolving in acetone and filtering.

The polymer solution was next heated under vacuum at 60° C. for 20 hours to remove acetone and provide poly(methoxy poly(ethylene glycol) monomethacrylate) (PMPEG 9) with an intrinsic viscosity, determined in water at 25° C., of $0.8 \times 100$ ml $g^{-1}$.

EXAMPLE 2

The procedure of Example 1 was repeated using monomeric methoxy poly(ethylene glycol) methacrylate (ex Polyscience Ltd. wherein n as defined above has an average value of 22). Poly(methoxy poly(ethylene glycol) monomethacrylate) (PMPEG 22) with an intrinsic viscosity, determined in water at 25° C., of $0.6 \times 100$ ml $g^{-1}$ were obtained.

EXAMPLE 3

The procedure of Example 1 was repeated using a mixture of the monomer used in Example 1 with the monomer used in Example 2 at a weight ratio of 25:75.

EXAMPLE 4

The procedure of Example 1 was repeated using a mixture of the monomer used in Example 1 with the monomer used in Example 2 at a weight ratio of 50:50.

EXAMPLE 5

This Example illustrates the preparation of conductive ion-containing polymeric materials prepared from the polymers of Examples 1 to 4.

First, lithium trifluoromethanesulphonate (lithium triflate) was prepared by neutralising triflic acid (ex Fluorochemicals Ltd.) with lithium hydroxide in aqueous solution. The water was then removed on a rotary evaporator and the salt was purified by recrystallisation from an acetone/toluene mixture; and by drying under vacuum at 140° C. for 24 hours.

The polymeric materials were then prepared by forming homogeneous solutions of PMPEG 9; PMPEG 22; the copolymer of Example 3; and the copolymer of Example 4, respectively, with lithium triflate in acetone. The acetone was removed by evaporation and the polymeric materials were dried in stainless steel equipment by heating under vacuum at 135° C. for 20 hours.

The ratio of the number of moles of ethylene oxide units to the number of moles of lithium ions, $O/Li^+$, was 18 in each complex.

EXAMPLE 6

The procedure of Example 1 was repeated using monomeric methoxy poly(ethylene glycol) methacrylate (ex Polyscience Ltd. wherein n as defined above has an average value of 4). Poly(methoxy poly(ethylene glycol) monomethacrylate) (PMPEG 4) with an intrinsic viscosity, determined in water at 25° C., of $1.26 \times 100$ ml $g^{-1}$ was obtained.

EXAMPLE 7

The procedure of Example 5 was repeated using PMPEG 4 with lithium triflate. The polymeric material had an $O/Li^+$ ratio of 18.

EXAMPLE 8

This Example illustrates the method of determining the conductivities of the polymeric materials prepared in Example 5. The Example is further illustrated with reference to the accompanying drawing, in which the sole Figure depicts graphically the variation of electrical conductivity (as ordinate, decadic logarithmic scale) with reciprocal temperature $\times 10^3$ (as abscissa). Results for a prior art complex are also depicted for comparison.

EXAMPLE 9

15 cm$^3$ of methoxy poly(ethylene glycol)monomethacrylate wherein n as defined above has an average value of 9 containing 0.31 g of $NaBF_4$ was polymerised between polyethylene plates at 50° C. for 24 hours using $\sim 0.07$ g of benzoyl peroxide as initiator. The resulting clear, transparent film had a thickness of 0.3 mm. Its room temperature bulk conductivity was measured by the aforementioned procedure (a) between brass plate electrodes and (b) using evaporated aluminium film electrodes. Conductivity values of $\sim 2 \times 10^{-5} \Omega^{-1}$ cm$^{-1}$ were determined at 23° C. The conductivity of a film prepared similarly, but without added inorganic salt, was less than $10^{-7} \Omega^{-1}$ cm$^{-1}$.

EXAMPLE 10

To a solution of methyltrichlorosilane (1.3 cm$^3$) in dried benzene 5 cm$^3$ of polyethylene glycol monomethyl ether (relative molecular mass 550) was added. Polymerisation was then brought about by addition of water followed by heating in a water bath. After prolonged drying under reduced pressure, the polymer was dispersed in a solution of NaSCN in methanol ($\sim 1.1$ mol dm$^{-3}$). Methanol was next removed by evaporation under reduced pressure at 50° C. The bulk conductivity was determined by the aforementioned procedure for a sample with a O/Na$^+$ ratio of 25; a value of $\sim 1.5 \times 10^{-5} \Omega^{-1}$ cm$^{-1}$ was obtained at 21° C.

What is claimed is:

1. An ionically conductive, ion-containing polymeric material prepared from an amorphous copolymer and a source of ions and having a bulk ionic conductivity at 20° C. and 10 kHz greater than $10^{-6} \Omega^{-1}$ cm$^{-1}$, wherein the copolymer comprises a polymerized acrylic acid, polymerized methacrylic acid or siloxane backbone from which depends at least one residue of the formula:

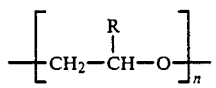

wherein:
   n represents a number greater than 1; and
   R represents a hydrogen atom or substituted or unsubstituted alkyl group of 1 to 5 carbon atoms.

2. A polymeric material according to claim 1 wherein $5 \leq n < 15$.

3. A polymeric material according to claim 1 wherein R represents a hydrogen atom or an unsubstituted C$_1$ to C$_3$ alkyl group.

4. A polymeric material according to claim 1 wherein all of the residues depending from the backbone are the same.

5. A polymeric material according to claim 4 wherein the residues are polyethylene oxide residues.

6. A polymeric material according to claim 1 wherein the polymer comprises a saturated carbon-carbon backbone.

7. A polymeric material according to claim 6 wherein the backbone comprises polymerised acrylic acid or methacrylic acid.

8. A polymeric material according to claim 1 wherein the polymer comprises a siloxane backbone.

9. A polymeric material according to claim 8 wherein the siloxane is prepared by polymerising, alone or in admixture together, a substituted di- or tri-halosilane which contains one or more residues of the formula defined in claim 1.

10. A polymeric material according to claim 1 wherein the sources of ions is at least one cation selected from the group consisting of lithium and sodium.

11. A polymeric material according to claim 1 wherein, at a temperature of 20° C. and a frequency of 10 kHz, the bulk ionic conductivity of the complex is greater than $4.50 \Omega^{-1}$ cm$^{-1}$.

12. A polymeric material according to claim 1 which is subjected to post-fabrication crosslinking.

13. A galvanic cell wherein the electrolyte is a polymeric material as defined in claim 1.

14. A polymeric material according to claim 1, wherein the R group of each residue is the same.

15. A polymeric material according to claim 14, wherein R is hydrogen.

16. A polymeric material according to claim 8, wherein the siloxane is prepared by polymerizing a substituted di- or tri-halosilane which contains one or more of said residues, or a mixture thereof, together with one of more other substituted halosilanes.

17. A polymeric material according to claim 1, wherein said ions are cations and the ratio 0/M$^+$ is from 6:1 to 25:1, wherein 0 is the number of mols of alkylene oxide units in said polymeric material and M$^+$ is the number of cations therein.

18. A polymeric material according to claim 1, wherein said ions are monovalent cation ions.

19. A polymeric material according to claim 1, wherein n is more than 1 and less than or equal to 22.

* * * * *